United States Patent
Rathi et al.

(10) Patent No.: US 8,077,855 B2
(45) Date of Patent: Dec. 13, 2011

(54) ENHANCED ADDRESSING FOR FAX RECIPIENTS

(75) Inventors: Vibha Rathi, Bellevue, WA (US); Manoj K. Jain, Hyderabad (IN); Suryanarayana Shastri, Yellareddyguda (IN); Archan Das, Begumpet (IN)

(73) Assignee: Microsoft Corporation, Redmond, WA (US)

( * ) Notice: Subject to any disclaimer, the term of this patent is extended or adjusted under 35 U.S.C. 154(b) by 1219 days.

(21) Appl. No.: 11/279,214

(22) Filed: Apr. 10, 2006

(65) Prior Publication Data
US 2007/0263806 A1  Nov. 15, 2007

(51) Int. Cl.
*H04M 1/00* (2006.01)
*H04M 3/00* (2006.01)
(52) U.S. Cl. ............... 379/355.02; 379/100.01
(58) Field of Classification Search ............. 379/100.01, 379/355.02
See application file for complete search history.

(56) References Cited

U.S. PATENT DOCUMENTS

| 6,944,610 | B2 * | 9/2005 | Moore et al. ............... 1/1 |
| 2002/0095454 | A1 * | 7/2002 | Reed et al. ............... 709/201 |
| 2002/0183044 | A1 * | 12/2002 | Blackwell et al. ............ 455/412 |
| 2007/0061420 | A1 * | 3/2007 | Basner ............... 709/217 |

* cited by examiner

*Primary Examiner* — Alexander Jamal
(74) *Attorney, Agent, or Firm* — Lee & Hayes, PLLC

(57) ABSTRACT

A rich, robust fax addressing experience is provided for users. In some embodiments, multiple different ways of addressing a fax and related functionality are exposed to a user and work seamlessly together to give a compelling addressing experience. In some embodiments, a fax application can resolve recipient names and/or numbers. Additionally, a user can type in a fax number and have that number resolved as a valid number. Further, some embodiments can provide a user interface that is designed to help a user compose a fax number, thus ensuring that the number is in the proper format. In some embodiments, the fax application can allow the user to choose from among a number of different address books and then employ the chosen address book in the fax addressing experience.

19 Claims, 9 Drawing Sheets

ENHANCED ADDRESSING FOR FAX RECIPIENTS

BACKGROUND

In today's world, people are required to collect and manage information about a large number of personal and work-related contacts. Users can typically store their contact information in address books, diaries, contact managers and the like. When a user wishes to communicate with one of their contacts, they may need to consult this stored information. For example, if a user wishes to fax one of their contacts a document of some type, the user may need to consult the contact information to ascertain the contact's fax number.

If the user intends to manually fax the document, they will typically physically enter the fax number into a fax machine via some type of hard user interface. If the user is using a desktop faxing application or an Internet faxing solution, the user will typically have to convey this information to the faxing entity in some way. In these non-manual alternatives, the addressing experience exposed to the user is often non-standard and disparate as between the different alternatives. Moreover, the addressing experience is a very light, non-robust experience. For example, the user may simply be required to enter the fax number, and this may be the only option for the user to address a fax.

SUMMARY

The described embodiments can provide a rich, robust fax addressing experience for users who utilize personal computer-based faxing. In accordance with the described embodiments, multiple different ways of addressing a fax and related functionality are exposed to a user. In at least some embodiments, a fax application can resolve recipient names and/or numbers. For example, when a user types in a recipient name, such name can be resolved against one or more address books that can be selected by the user. Additionally, a user can type in a fax number and have that number resolved as a valid number. Further, at least some embodiments can provide a user interface that is designed to help a user compose a fax number, thus ensuring that the number is in the proper format. In at least other embodiments, the fax application can allow the user to choose from among a number of different address books and then employ the chosen address book in the fax addressing experience.

BRIEF DESCRIPTION OF THE DRAWINGS

FIG. 6 illustrates a user interface in accordance with one embodiment.

FIG. 10 illustrates a user interface in accordance with one embodiment.

FIG. 11 illustrates a user interface in accordance with one embodiment.

DETAILED DESCRIPTION

Overview

The described embodiments can provide a rich, robust fax addressing experience for users who utilize personal computer-based faxing. In accordance with the described embodiments, multiple different ways of addressing a fax and related functionality are exposed to a user. In at least some embodiments, a fax application can resolve recipient names and/or numbers. For example, when a user types in a recipient name, such name can be resolved against one or more address books that can be selected by the user. Additionally, a user can type in a fax number and have that number resolved as a valid number. Further, at least some embodiments can provide a user interface that is designed to help a user compose a fax number, thus ensuring that the number is in the proper format. In at least other embodiments, the fax application can allow the user to choose from among a number of different address books and then employ the chosen address book in the fax addressing experience.

In at least some embodiments, all of this particular functionality is provided together to give the user a rich and robust fax addressing experience.

Exemplary Environment

Figure 1:
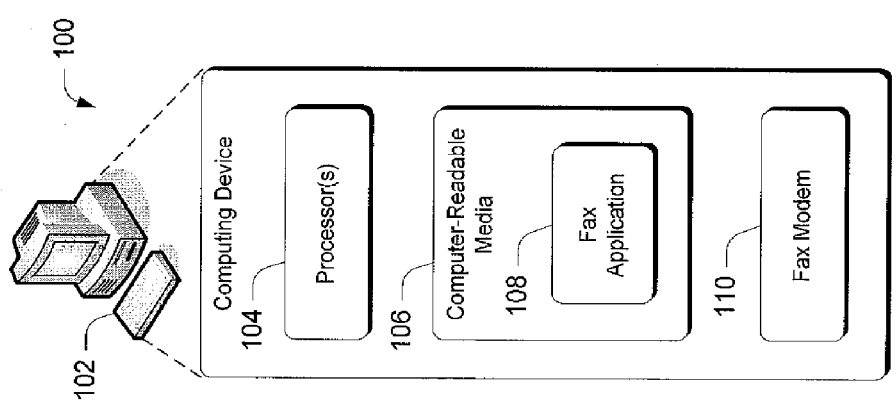
FIG. 1 illustrates an exemplary environment in which the inventive embodiments can be employed in accordance with one embodiment.

FIG. 1 illustrates, in accordance with one embodiment, an exemplary environment in which the inventive embodiments can be employed generally at 100.

Here, system 100 includes a computing device in the form of a client computing device 102. In this example, the client computing device comprises one or more processors 104 and one or more computer-readable media 106 on which executable, computer-readable instructions reside. In this example, computer-readable media 106 includes code that implements a fax application 108. In this particular example, computing device 102 also includes or otherwise uses a fax modem 110 which, together with fax application 108, can enable a user to send and receive faxes. In addition, fax application 108 includes functionality for enhancing the user's fax addressing experience as described in more detail below.

It is to be appreciated and understood that while the computing device is illustrated as a desktop device, such device can take other forms such as a laptop or notebook computer, handheld computer, or any other type of computing device that can be used in connection with a fax application.

Figure 2:
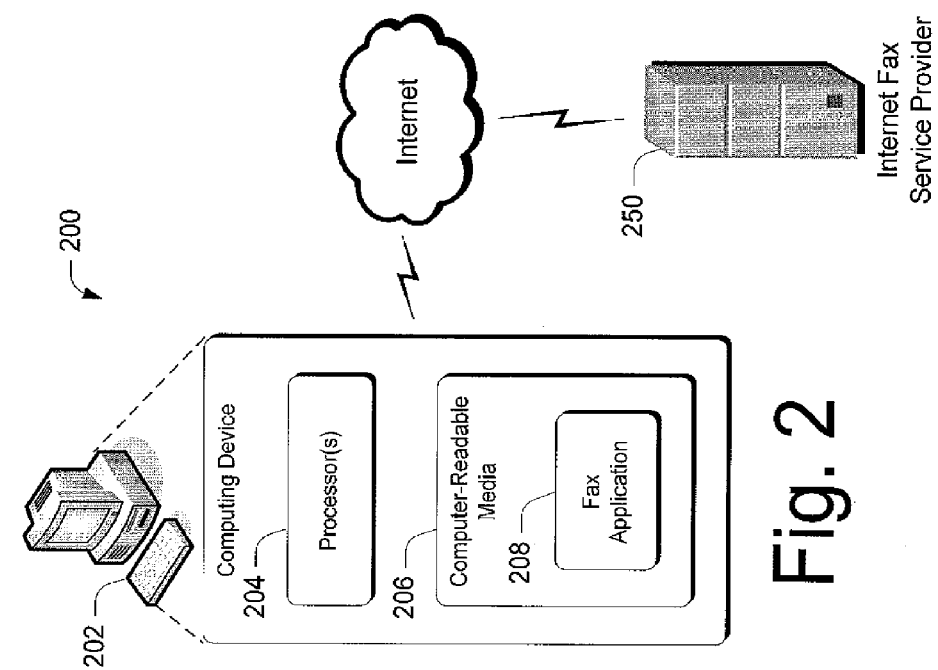
FIG. 2 illustrates an exemplary environment in which the inventive embodiments can be employed in accordance with one embodiment.

FIG. 2 illustrates, in accordance with another embodiment, an exemplary environment in which the inventive embodiments can be employed generally at 200.

Here, system 200 includes a computing device in the form of a client computing device 202. In this example, the client computing device comprises bone or more processors 204 and one or more computer-readable media 206 on which executable, computer-readable instructions reside. In this example, computer-readable media 206 includes code that implements a fax application 208. In this particular example, fax application 208 is configured to utilize a network-accessible fax service provider, such as Internet fax service provider 250. One example of a network accessible fax service provider is Windows® Fax Server. Typically, to use such a provider, a user will upload their document to the provider which will thereafter fax the document to one or more intended recipients. Faxes are typically, although not always, received from such providers in the form of an email attachment.

It is to be appreciated and understood that while the computing device is illustrated as a desktop device, such device can take other forms such as a laptop or notebook computer, handheld computer, or any other type of computing device that can be used in connection with a fax application.

Exemplary Fax Application

Figure 3:
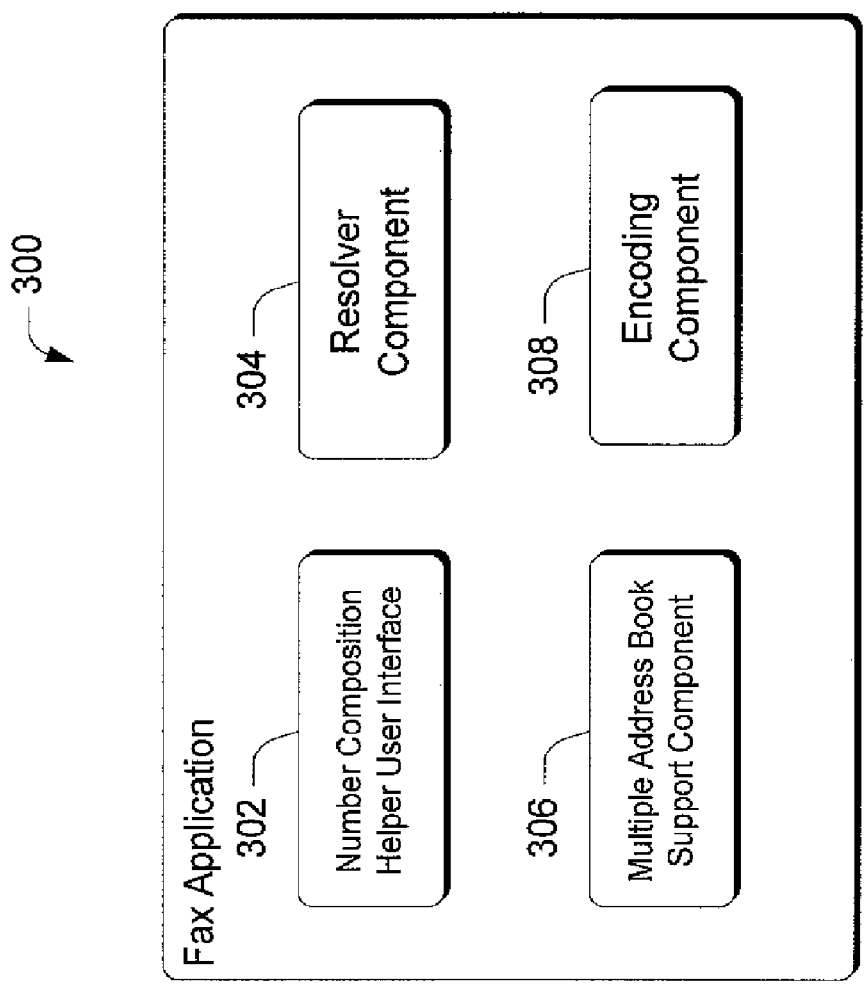
FIG. 3 illustrates a block diagram of an exemplary fax application in accordance with one embodiment.

FIG. 3 illustrates and exemplary fax application in accordance with one embodiment generally at 300. In this example, in addition to the usual and typical fax functionality, the fax application comprises one or more of a number composition helper user interface 302, resolver component 304, multiple address book support component 306 and/or an encoding component 308, all of which are described in more detail below.

In at least some embodiments, the fax application includes all of the above-identified components which, collectively, provide a very robust and rich is addressing experience for the user. Further, in at least some embodiments, the fax application is intended to work with MAPI-compliant address book providers. MAPI or Messaging API is a publicly-available, well-documented API and includes programming interfaces that are used by MAPI subsystems, by client application writers, and by service provider writers. The main programming interface is an object-based interface known as the MAPI programming interface. Based on the OLE Component Object Model, the MAPI programming interface is used by the MAPI subsystem and by messaging-based client applications and service providers written in C or C++.

It is to be appreciated and understood that the inventive concepts can be employed in contexts other than MAPI contexts without departing from the spirit and scope of the claimed subject matter.

In the discussion below, intended fax recipients can assume a couple of different forms or types—a composed number or an address book contact.

Composed numbers are represented using a special fax format as follows:

[Name]<Number>

These can be composed using the number composition helper user interface 302 or just by typing the recipient in the address line manually. The Nazme part of the format is optional. The Number part of the format can be a simple sequence of digits (e.g., 4257022290) or a canonical number (e.g., +1 (425) 7022290).

Alternately or additionally, a fax recipient can take the form of a contact in an address book. Here, a contact's name can be typed in and resolved against an address book on the click of a button, or recipients can be picked by invoking the address book's user interface, as described in more detail below. This particular way of representing recipients provides for easy addition, editing and deletion of fax recipients. Further, it allows for several other features such as viewing a contact's properties, adding the contact to an address book, auto-complete and the like, at the click of a button, as will become apparent below.

Number Composition Helper User Interface

The number composition helper user interface 302 or simply "composition interface" is configured to enable a user to input or otherwise build addressing information in a manner that is standardized and designed to eliminate or at least reduce the chances that an erroneous format is entered. In at least some embodiments, the composition interface includes controls for entering a recipient's name and various fax number details. In at least some embodiments, one or more drop-down menu items can be provided to help the user construct the addressing information for their fax. Once the composition interface has been used to construct the addressing information, it can be added to the appropriate "To" field and other fields in the fax to be sent. One specific example of a composition interface is provided below in the section entitled "Implementation Example".

Resolver Component

The resolver component 304 can be configured to resolve information that is entered by the user in a couple of different ways.

For example, if a user enters, in the address line, the name of a particular recipient, then the resolver component can resolve this name against one or more address books that are available to the user. For example, the user may have two different address books—a Windows® address book and an Outlook® address book. If the user has selected the Outlook® address book, then the resolver component 304 can resolve the entered name against the Outlook® address book. Accordingly, when the fax is sent, the fax application will retrieve the fax number of the intended recipient from the selected address book.

Alternately or additionally, the user may instead choose to enter, in an appropriate user interface field, a fax number instead of a recipient's name. In this case, the resolver component 304 can resolve the entered fax number and show the number as a valid number. In this case, the entered number can be resolved against a format to ensure that the format of the number is valid. Examples of how this can be done are given below in the section entitled "Implementation Example".

In MAPI contexts in which the recipient is not represented as a composed number, this can be implemented by programmatically calling the appropriate Resolve method of the selected address book provider, given the display name of the contact. When the recipient is represented as a composed number, if the number is valid, a one-off entry is created in the address book and a dummy entry identifier is obtained and shown as a resolved address.

Multiple Address Book Support Component

In accordance with one embodiment and as alluded to above, a user can be provided with an opportunity to select from amongst a number of different address books that they may have available. That is, a user may have several different address books. At the beginning of the faxing session, a user interface can be presented to the user through which the user can search for and/or select the particular address book that is to serve as the basis for the addressing that takes place during that session.

Encoding Component

In contexts that include MAPI-compliant contexts, fax format addresses can be encoded to prevent them from being construed as address book contacts and to prevent MIME from treating them as email addresses. For example, while saving a partially composed fax message as a draft, certain embodiments utilize the EML format which is a well-document and known format. Systems that utilize EML are tailored for email and try to parse the fax format (e.g. Name<number>) as an email address even though it is, in fact, a fax address. To prevent this situation, the fax address is encoded by pre-pending a fax-specific GUID to it. Additionally, if there is a contact with a display name, such as John<1244> in the address book, the GUID will prevent it from being resolved against the address book.

Implementation Example

The discussion below describes an implementation example. Such example is not intended to limitation application of the claimed subject matter to this particular example. Rather, this example is provided to assist the reader in understanding how one might implement the above-described functionality. In the discussion that follows, two main sections are provided: "Addressing Faxes" and "Validation of Addresses and Address Resolution", each of which will have several subsections. In the discussion that follows, the implementation example is described in the context of the Windows® Fax and Scan solution.

Addressing Faxes

This section describes the details of various ways in which faxes can be addressed.

Number

Figure 4:
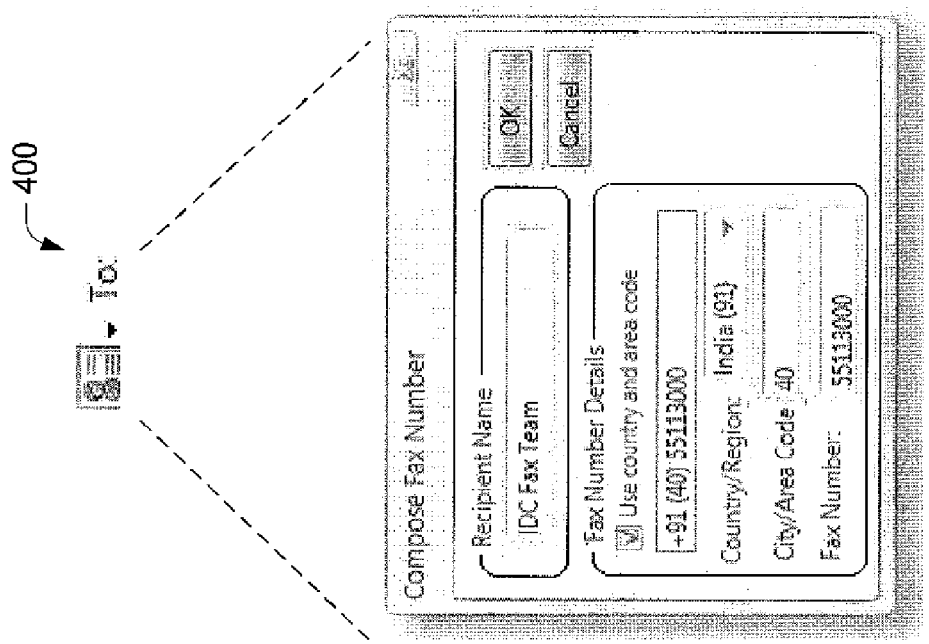
FIG. 4 illustrates a user interface in accordance with one embodiment.

The first way to address a fax is simply by the number. That is, the simplest way of addressing a fax is to type a number in the 'To' line of the Fax Compose Form. Numbers are separated by semi-colons (;) and a valid fax number consists of the digits 0-9 and modem control characters. Multiple numbers are entered on the 'To' line and separated by semi-colons. Additionally, a user interface (UI) is provided to help the user compose a canonically valid fax number. This UI is launched from the 'To:' button by clicking on the down arrow which launches a menu that displays the 'Compose Fax Number' UI. An exemplary "To" button and associated "Compose Fax Number UI" are shown in FIG. 4 at 400.

There, the "Compose Fax Number UI" has the following controls:
- Recipient Name: Free-format text. Semi-colons not allowed, all other characters allowed.
- Use country and area code: A checkbox that enables/disables the country selection dropdown and the area code text box so that the user can enter a local number. This setting is on by default.
- Country/Region: List-box populated with the list of country and their international dialing codes
- City/Area Code: Free-format text. Only numeric input allowed
- Fax Number: Free-format text. Numbers 0-9 and modem control characters allowed.
- Fax Number Details: A label that displays the number that is under composition.
- OK: When clicked, closes the dialog and the number is transferred to the 'To' field as appropriate.
- Cancel: Cancels the dialog with no changes to the 'To' line.

Contact

Faxes can also be addressed using the Windows® Address Book or MAPI Address Book (GAL). In implementations that do not utilize or provide the user with an option to select from multiple different address books, default address books can be utilized. For example, when Outlook® is installed on the client computer, the MAPI address book is the default address book for WFS. When Outlook® is not installed, the Windows® Address Book (WAB) is the default address book. Of course, just because a default address book is used does not mean that a user cannot opt to select another address book. In this case, the default address book would be the starting address book and the user would be free to select a different address book.

Adding Fax Number Information to an Existing Contact

With regard to adding fax number information for an existing contact, consider the following.

Figure 5:
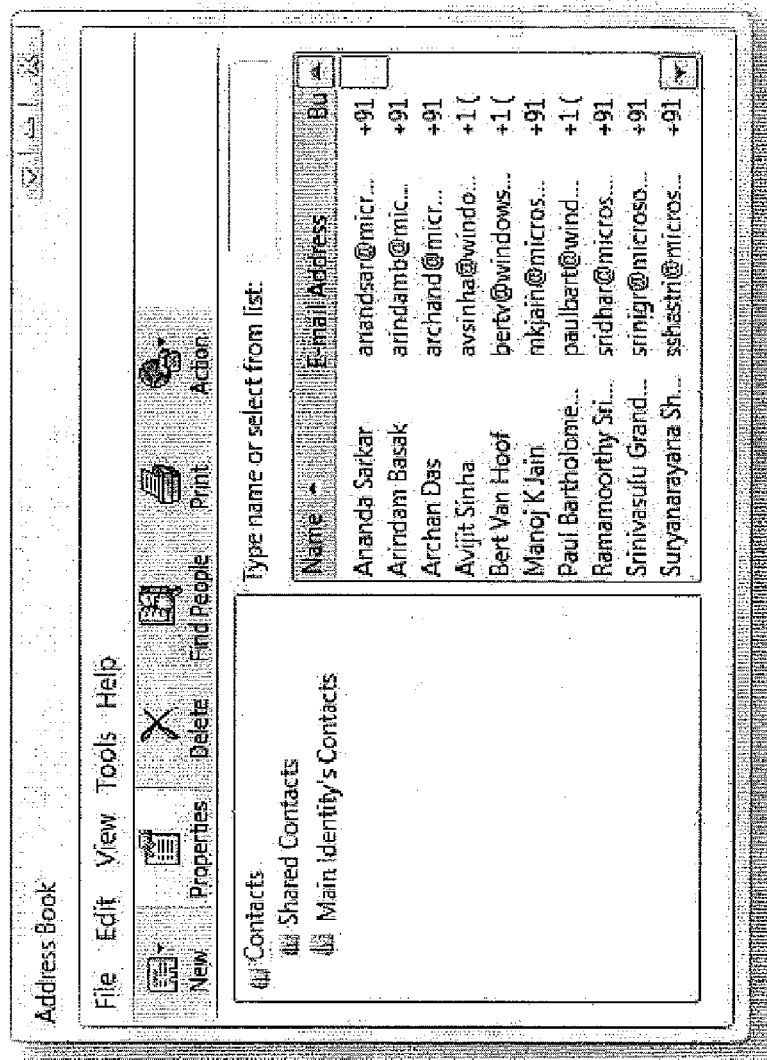
FIG. 5 illustrates a user interface in accordance with one embodiment.

In the Windows Address Book scenario, fax number information can be added and the Windows Address book can store 2 fax numbers per contact in the following fields: Business fax number and Home fax number. To update a contact with his fax number, the user launches the Address Book and opens the contact as shown in FIG. 5 at 500. The Business Fax number can be added in the 'Business' Tab under the field 'Fax'. There is no validation of the fax number format. The user has to make sure that the Fax number entered is valid. The Personal Fax number can be added in the 'Home' Tab under the field 'Fax'. There is no in-built validation of this field.

The Business Fax number is considered the default fax number of the contact. The 'Summary' tab also displays the Business Fax number of the contact if entered.

Figure 6:
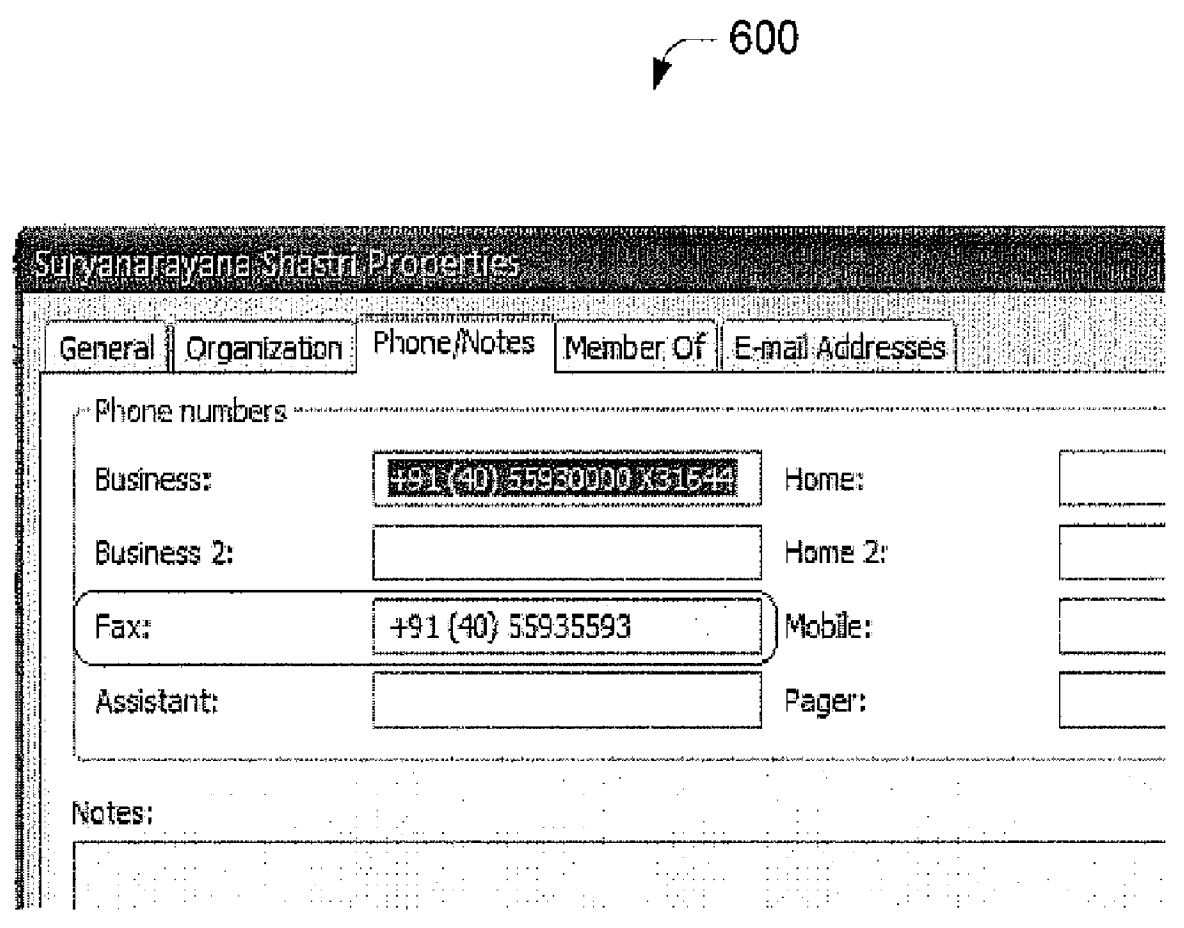

In the MAPI Address Book context, fax number information can be added to existing contacts as follows. For a contact in the GAL, the relevant field is the 'Fax' field in the 'Phone/Notes' tab of Contact Properties. Note that only the administrator can edit these settings. An associated user interface is shown in FIG. 6 at 600.

Figure 7:
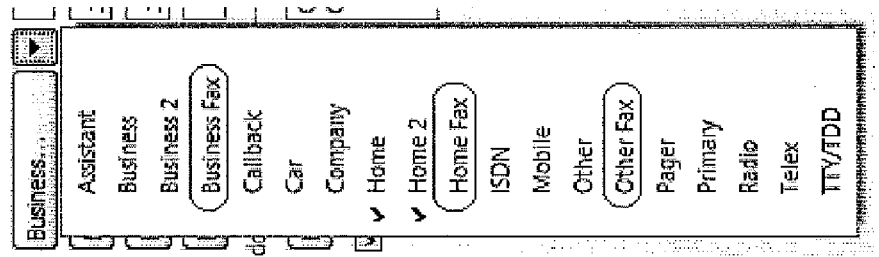
FIG. 7 illustrates a user interface in accordance with one embodiment.

For a contact in Personal Contacts, the relevant fields are: Business Fax, Home Fax and Other Fax, as shown in FIG. 7 at 700. The Business Fax is considered the default, followed by the Home and then the Other Fax number. A non-administrative user can edit these settings because these are personal contacts stored in Outlook.

Adding a New Fax Contact

With regard to adding a new fax contact, consider the following.

In the Windows Address Book context, to create a new contact, the 'File|New Contact' on the Address Book Main Menu or its associated Toolbar Icon is clicked. It launches the Contact Details page. A name for the contact is filled in the 'Name' Tab. All the other fields are optional. To enter a fax number, the user navigates to the Business Tab and types the number in the 'Fax' field. To add a Personal fax number, the user navigates to the 'Home' tab and adds the fax number.

In the MAPI Address Book context, a new contact cannot be created in the GAL by a non-administrative user. Users can create personal contacts by navigating to the 'Contacts' pane in Outlook. The 'Phone numbers' section in the 'General' tab of personal contacts allows the user to enter Business Fax, Home Fax and Other Fax.

Sending a Fax

With regard to sending a fax to a contact in the Address Book, consider the following.

In the Windows Address Book context, right-clicking on a contact can provide easy task to 'Send Fax'.

In the MAPI Address Book context, right-clicking on a contact can provide easy task to 'Send Fax'. A fax can be sent from the Fax Compose Form or from the Address Book.

Figure 8:
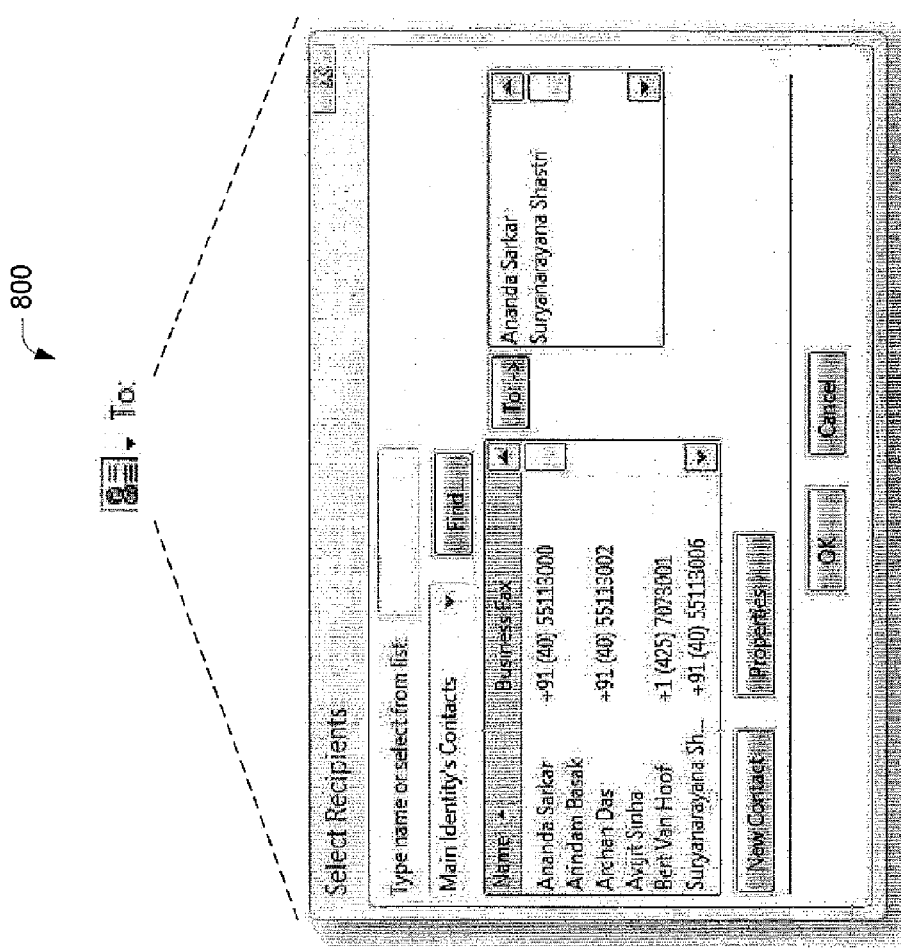
FIG. 8 illustrates a user interface in accordance with one embodiment.

From the Fax Compose Form in the Windows Address Book context, such can be done by clicking on the icons for 'To' on the Fax Compose Form to bring up the Select Recipients Dialog of the Windows Address book when Outlook is not installed, as shown in FIG. 8 at 800. Here, the name of the contact and his Business Fax Number are listed as the default items in the view. The user can click on 'To' button to populate the To recipients of the Fax Message. Clicking on OK transfers the selected recipients to the Fax Compose Window and clicking on Cancel closes the Dialog without any changes.

If the chosen contact on the 'To' line does not have a fax number associated with it either in the Business Fax or the Personal Fax field, the contact is not added to the list and is displayed in a visually distinctive manner, such as by being shown in red. In the case, the fax is not sent until the user either removes the erroneous contact from the "To" line or provides a valid fax number for the contact. The Fax is always sent to the primary fax number, which is the Business Fax number. If the Business fax number does not exist, the fax is sent to the Personal fax number. If that too is blank, the user is warned with an error message and is not allowed choose the contact in the 'To' list box.

If both the Business Fax and Personal Fax field have valid telephone numbers listed in them, the Fax is always sent only to the Primary Fax number, which is the Business Fax number. If the user wants to send a Fax to the Personal Fax number, he has to type the number in the 'To' field in the Compose Form, or the Address Book should provide a task to send the fax to the alternate Fax number.

Figure 9:
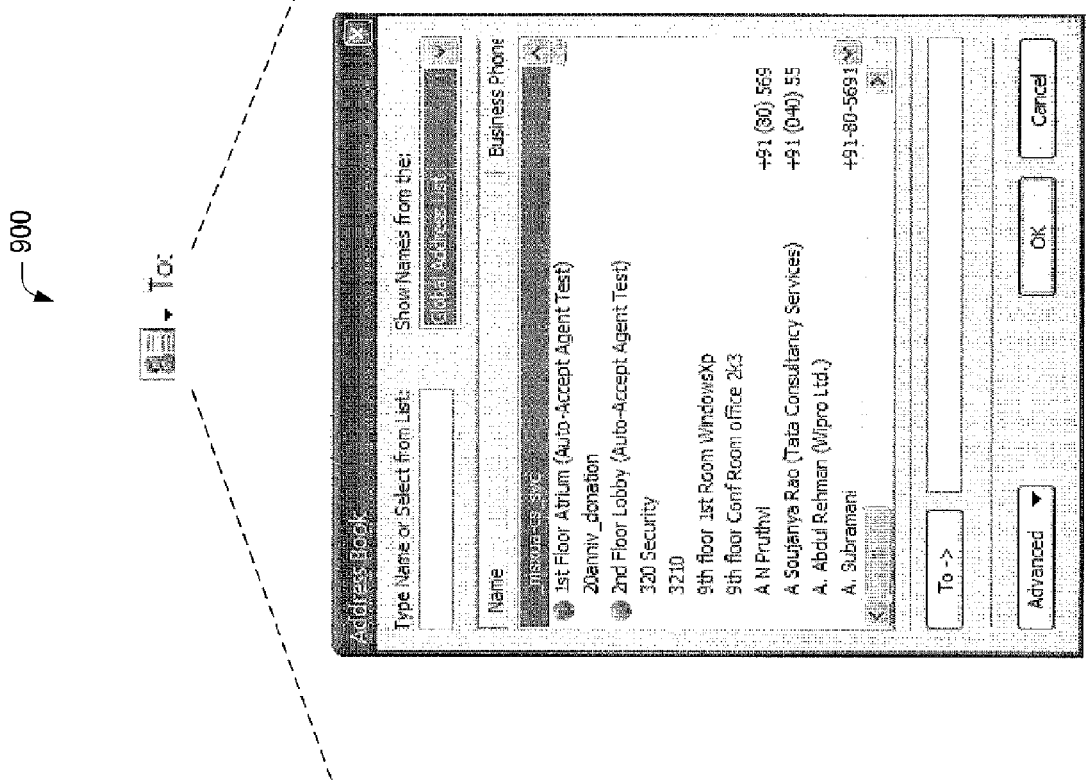
FIG. 9 illustrates a user interface in accordance with one embodiment.

From the Fax Compose Form in the MAPI Address Book context, such can be done by clicking on the icons for 'To' on the Fax Compose Form which brings up the Select Recipients Dialog of the MAPI Address book when Outlook is installed, as shown in FIG. 9 at 900. There, the name of the contact and the Fax number are listed. The user can double-click the contact, or choose and click on the 'To' button to transfer a contact to the To line in the dialog shown in FIG. 9.

Addition of contacts to the 'To' line is allowed, but validation is done on 'OK' if the chosen contact has a valid fax number—'Fax' number in the case of a GAL contact, or one of the three numbers—'Business Fax', 'Home Fax', or 'Other Fax' in case of a Personal Contact. If the numbers are blank, then the contact is shown in a visually distinctive manner as described above.

With respect to sending a Fax from the Address Book, consider the following.

In the Windows Address Book context, the Address book should have tasks that facilitate the sending of Faxes to Contacts. The 'Actions' Icon on the Main Toolbar of the Address Book and the 'Tools|Action' Menu item should have a task for sending a Fax, such as that shown in FIG. 10 at 1000. Clicking on 'Send Fax' should launch the Fax Compose form with the contact on the 'To' line. Similarly, right-clicking context menu of a contact in the Address Book should also launch a similar menu.

In the MAPI Address Book context, the MAPI address book should have simple tasks that facilitate sending of Faxes to Contacts. For example, in the 'File|Send a fax'—the file menu should have an action to send a fax; the toolbar icon can have a corresponding icon for sending a fax; and, in the Personal contacts folder, right clicking the context menu on a contact should allow a simple task to send a fax.

Adding Fax Number Information for an Existing Group

Figures 10, 11:
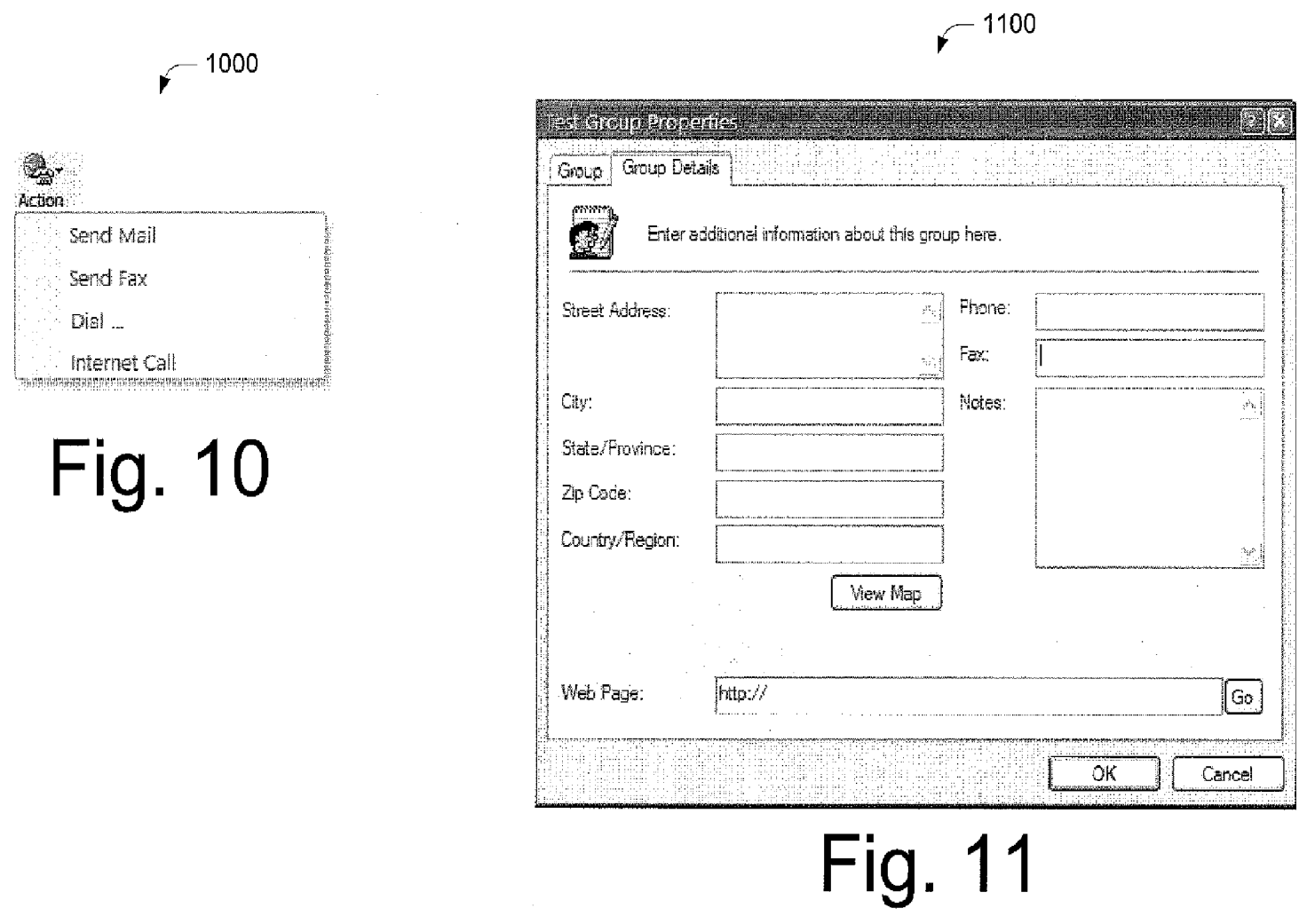

In the Windows Address Book context, Groups can have a fax number that is entered in the 'Group Details' page, as indicated in FIG. 11 at 1100. In the MAPI Address Book context, Groups cannot have fax numbers.

Sending a Fax to a Group in the Address Book

In the Windows Address Book context, when a group is chosen from the Windows Address Book, the group is added to the 'To:' line of the Compose Form. The contacts corresponding to the group are not expanded. Groups are always shown in bold. If all the recipients of the group have fax numbers, the group is shown in bold black and underlined. If some of the recipients in the group do not have fax numbers, the group is shown in bold red and underlined. When the user clicks on Send, all the members who do not have fax numbers are discarded, and the fax is sent to the rest—after displaying a warning message to the user. Note that it is not possible for the user to manually or selectively remove recipients from an added group as a group is never expanded to display its constituent members.

In the MAPI Address Book context, when a group is chosen from the MAPI Address Book, the group is added to the 'To:' line of the Compose Form. The contacts corresponding to the group are not expanded. Groups are always shown in bold. If all the recipients of the group have fax numbers, the group is in bold black and underlined. If some of the recipients in the group do not have fax numbers, the group is shown in bold red and underlined. When the user clicks on Send, all the members who do not have fax numbers are discarded, and the fax is sent to the rest—after displaying a warning message to the user. Note that it is not possible for the user to manually or selectively remove recipients from an added group as a group is never expanded to display its constituent members.

Validation of Addresses and Address Resolution

The discussion below describes validation of numbers and contacts, each under its own heading.

Numbers

Numbers can be entered on the 'To:' line, or the 'Compose Fax Number' UI can be invoked to add a Fax Number to the 'To:' line. TAPI (Telephone API provided by Microsoft) uses a Canonical Number Format. The canonical format is intended to be a universally constant directory number. For this reason, numbers in address books are best stored using canonical format. A canonical phone number is a text string with the following structure.

+Country Code <space>[(Area Code)<space>] Subscriber Number|Subaddress ^ Name CRLF

| Component | Meaning |
|---|---|
| + | Equivalent to hex 2B. Indicates that the number that follows it uses the canonical format. |
| CountryCode | A variably sized string containing one or more of the digits "0" through "9" (hex 30 through 39, inclusive). The CountryCode is delimited by the following Space. It identifies the country/region in which the address is located. |
| <space> | Exactly one space character (hex 20). It is used to delimit the end of the CountryCode part of an address. |
| AreaCode | A variably sized string containing zero or more of the digits "0" through "9" (hex 30 through 39, inclusive). AreaCode is the area code part of the address and is optional. If the area code is present, it must be preceded by exactly one left parenthesis character (28), and be followed by exactly one right parenthesis character (29) and one space character (20). |
| SubscriberNumber | A variably sized string containing one or more of the digits "0" through "9" (hex 30 through 39, inclusive). It may include other formatting characters as well, including any of the dialing control characters described in the Dialable Address Format: |

| Character | Hex encoding |
|---|---|
| ! | 20 |
| # | 23 |
| $ | 24 |
| * | 2A |
| , | 2C |
| ? | 3F |
| @ | 40 |
| ABCD | 41-44 |
| P | 50 |
| T | 54 |
| W | 77 |
| abcd | 61-64 |
| p | 70 |
| t | 74 |
| w | 79 |

The subscriber number should not contain the left parenthesis or right parenthesis character (which are used only to delimit the area code), nor should it contain the "|", "^", or CRLF characters (which are used to begin following fields). Most commonly, nondigit characters in the subscriber number would include only spaces, periods ("."), -continued

| Component | Meaning |
|---|---|
| | and dashes ("-"). Any allowable nondigit characters that appear in the subscriber number are omitted from the DialableString returned by the lineTranslateAddress function, but are retained in the DisplayableString. |
| \| | Hex (7C). If this optional character is present, the information following it up to the next + \| ^ CRLF, or the end of the canonical address string, is treated as subaddress information, as for an ISDN subaddress. |
| Subaddress | A variably sized string containing a subaddress. The string is delimited by + \| ^ CRLF or the end of the address string. During dialing, subaddress information is passed to the remote party. It can be such things as an ISDN subaddress or an e-mail address. |
| ^ | Hex (5E). If this optional character is present, the information following it up to the next CRLF or the end of the canonical address string is treated as an ISDN name. |
| Name | A variably sized string treated as name information. Name is delimited by CRLF or the end of the canonical address string and can contain other delimiters. During dialing, name information is passed to the remote party. |
| CRLF | Hex (0D) followed by Hex (0A), and is optional. If present, it indicates that another canonical number is following this one. It is used to separate multiple canonical addresses as part of a single address string (inverse multiplexing). For example, the canonical representation of the main switchboard telephone number at Microsoft Corporation would be: +1 (425) 882-8080 |

A valid number can be entered on the 'To:' line by simply typing it in. All these are valid numbers on the 'To:' line:
  55113000—only the fax number
  (40) 55113000—area code and fax number
  +91 (40) 55113000—country code, area code and fax number
  +1 (425) 7073000—international country code, area code and fax number
  55113000; 33113333—multiple numbers added and separated by semi-colons
  55113000; +1 (425) 7073000—multiple numbers added and separated by semi-colons Note that all these numbers can have modem control characters as well. When the user clicks on 'Check Recipients' or CTRL+K, the resolution of these numbers happens. When a number is resolved, it is underlined, enclosed by angle brackets (< >) and marked as a resolved recipient. An example of a resolved number-list on the 'To:' line is as follows:
  <55113000>; <+1 (425) 7073000>

Another important point to note is that there is no matching of numbers entered on the 'To:' line to the contacts in the address book. This means that any string of digits that is entered on the 'To:' line is automatically treated as a number and there is no effort to match the number against a contact in the Address Book. This leads to the following scenarios:
  If a user enters '1111' it is automatically treated as a number
  If a user enters '9,111' it is automatically treated as a number with modem control characters
  If a user enters '1111', and there is an existing contact with Display Name '1111' or a field '1111' in the contact details, the entry is not resolved as a 'Contact' but treated as a manually-entered number. If the user needs to pick the contact named '1111' he invokes the Windows Address Book explicitly. This can be a source of confusion to the end-user, hence this is documented in Help. This is a corner-case and does not adversely impact the user experience.

A number that is composed using the 'Compose Fax Number' is transferred to the 'To:' line as follows:
  A Number that is entered using the Country Code: IDC Fax Team <+91 (40) 55113000>;
  A Number that is entered without a Country Code: IDC Fax Team <55113000>;
  A Number that has no name associated with it: <55113000>;
  A Number that has no name associated with it: <+91 (40) 55113000>;
  A Number that has commas in the name: Fax Team, IDC <+91 (40) 55113000>;

Note that all the numbers are marked as resolved as soon as the UI is closed and the number is transferred to the 'To:' line.

For anything other than a contact, double-clicking a resolved address always launches the 'Compose Fax Number'. Take the following example:
  <55113000>, <+91 (40) 55113000 >, <+1 (425)707 3000>, IDC Fax Team <+91 (40) 555113000>; <+91 (40) 55113000>;

Clicking on each launches the 'Compose Fax Number' UI for editing with the following pre-filled:
  Name—blank, Country Code—blank, Area Code—blank, Number—55113000
  Name—blank, Country Code—India (91), Area Code—40, Number 55113000
  Name—blank, Country Code—USA (1), Area Code—425, Number-7073000
  Name—IDC Fax Team, Country Code—India (91), Area Code—40, Number-55113000
  Name—blank, Country Code—India (91), Area Code—40, Number-55113000

If the user makes any changes to the data in the 'Compose Fax Number' UI before clicking on OK, the changes are transferred to the 'To:' line. For example, if the user adds a name for the first resolved string and clicks on OK, the new Addressing looks like this:
  Windows Fax Team <55113000>, <+91 (40) 55113000>, <+1 (425) 707 3000>, IDC Fax Team <+91 (40) 55113000>; <+91 (40) 55113000>;

Note that only a best-effort matching is made for the entered number to Country Code, Area Code and Fax Number fields in the 'Compose Fax Number' UI. If the user enters an invalid country code (for example +456), the entire number is taken and placed it in the 'Fax Number' field for the user to fix and submit it back to the 'To:' line. The name is stripped and added in the 'Name' field.

Contacts

Any contacts added on the 'To' line without invoking the Address Book are automatically treated as resolved. At the point of resolution, they are not validated for Fax numbers for the contact. The validation whether the contact has a Business (or Personal) fax number is done only on Send and an appropriate error message displayed for missing Fax numbers.

Contacts support auto-complete on part name (Display Name of the contact). Resolution of a number to contact name is not supported. What this means is that if a user enters a number, and the number matches to an entry in the Contact list, the number is not replaced by the Contact Name. The reason for this is:
  There is no standard format for numbers in the address store. The user can enter anything currently. Matching a number entered on the To: line with the Contact is cumbersome.

The user can choose to type the number without the country code, area code etc. and also he can include modem-control characters.

Clicking on a number always launches the 'Compose Fax Number UI' and clicking on a contact launches the contact display pane (WAB or GAL as appropriate).

For example, if the user enters 2 contacts, here is how they look on the 'To:' line. Contacts are auto-resolved on addition to the 'To:' line.

IDC Fax Team; Ananda Sarkar

A better way of displaying is the name followed by the associated number, such as indicated just below:

IDC Fax Team <55113000>; Ananda Sarkar <55113003>

Note that the number displayed here is the 'Default' fax number for that contact. If there are multiple fax numbers for a given contact, a right-click context menu on a resolved contact should drop down a list of Fax numbers which the user can choose. The resolved string gets updated on the selection. For example, if the user chooses a different number for 'Ananda Sarkar' in the above scenario, the 'To:' line looks like:

IDC Fax Team <55113000>; Ananda Sarkar <55113004>

It should be noted here that there should be a differentiation between 'Contacts' and added numbers. When the user double-clicks a contact, the 'Contact Details' pane from the default Address book (WAB/GAL) should always be opened and not the 'Compose Fax Number' UI.

If the list of recipients on the 'To:' line cannot be prefixed by a contact icon, there is no way of identifying which recipient was chosen from the Address Book and which was added as a number on the 'To:' line. A number enclosed by angle brackets (< >) can always be treated as a number entered inline or via the Number helper. A resolved string like 'IDC Fax Team' can always be treated as a contact entered via the Address Book.

CONCLUSION

The described embodiments can provide a rich, robust fax addressing experience for users who utilize faxing functionality, such as that provided by desktop fax solutions and Internet fax service providers. In accordance with the described embodiments, multiple different ways of addressing a fax and related functionality are exposed to a user and work seamlessly together to give a compelling addressing experience to the user. In at least some embodiments, a fax application can resolve recipient names and/or numbers. For example, when a user types in a recipient name, such name can be resolved against one or more address books that can be selected by the user. Additionally, a user can type in a fax number and have that number resolved as a valid number. Further, at least some embodiments can provide a user interface that is designed to help a user compose a fax number, thus ensuring that the number is in the proper format. In at least other embodiments, the fax application can allow the user to choose from among a number of different address books and then employ the chosen address book in the fax addressing experience.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:
one or more computer-readable media; and
computer-readable instructions on the one or more computer-readable media which, when executed, provide fax addressing functionality configured to:
provide, on a display, a graphic user interface (GUI) to a fax application that facilitates a user to compose a fax including addressing information for a fax recipient, the GUI comprising one or more fields which permit entry of data relating to the fax;
provide, via the GUI, multiple different ways that enable the user to address the fax, at least one of which enabling the user to enter, via an input device, addressing information of the fax recipient into at least one of the one or more fields;
help the user enter the addressing information in a fax format;
provide at least a portion of the addressing information onto an addressing line for the fax;
resolve fax formatted addressing information as valid information;
in response to determining that the fax formatted addressing information is resolved, present the fax formatted addressing information with underlining and enclosed in angle brackets;
provide multiple address book support to enable the user to select from amongst multiple different address books, at least one of which being a messaging application programming interface (MAPI)-compliant address book; and
encode fax format addresses to use the fax format addresses in MAPI-compliant contexts.

2. The system of claim 1, wherein the multiple different ways that enable the user to address the fax comprise enabling the user to compose a recipient name, and wherein the computer-readable instructions are further configured to resolve the composed name as the recipient for the fax.

3. The system of claim 2, wherein the composed recipient name is resolved against one of the multiple different address books that are configured to be user-selectable via the GUI.

4. The system of claim 1, wherein the multiple different address books are available via the GUI.

5. The system of claim 1, wherein the fax functionality is further configured to provide, via the GUI, means to assist the user in composing a canonically valid fax address, and wherein the computer-readable instructions are further configured to provide the canonically valid fax address onto the addressing line presented in the GUI.

6. The system of claim 1, wherein the fax addressing functionality is further configured to show composed numbers as resolved recipients.

7. The system of claim 1, wherein the fax addressing functionality is further configured to work with MAPI-compliant address book providers.

8. The system of claim 1, wherein the fax addressing functionality represents the fax recipient by using either a composed number or a contact in an address book.

9. A system comprising:
a display to display a user interface of a fax application that assists a user in composing and addressing a fax, the fax application being configured to utilize a network-accessible fax service provider, the user interface comprising one or more fields which permit entry of data relating to the fax, the one or more fields including a "To" field in which address information is entered;
one or more processors;

one or more computer-readable media coupled to the one or more processors;

computer-readable instructions on the one or more computer-readable media which provide the user interface on the display, the fax application comprising:

a number composition helper user interface component that is configured to help the user enter addressing information for one or more fax recipients, at least some of which is then provided onto an addressing line for the fax, in a fax format, the fax format comprising [Name]<Number>, wherein the [Name] part of the format is optional, and wherein the <Number> part of the format is a canonical number;

a resolver component that is configured to resolve information provided by the user in different ways;

a multiple address book support component that is configured to enable the user to select one or more fax addresses from amongst different address books, at least one of which being a messaging application programming Interface (MAPI)-compliant address book; and an encoding component that is configured to encode fax format addresses so that the fax format address can be used in MAPI-compliant contexts, and to prevent the fax format addresses from being parsed as an e-mail address by pre-pending a fax-specific globally unique identifier (GUID) to the fax format addresses.

10. The system of claim 9, wherein the number composition helper user interface component is configured to provide at least one drop down menu to help the user construct the addressing information.

11. The system of claim 9, wherein the number composition helper user interface component is configured to enable the user to enter a canonically valid fax address.

12. The system of claim 9, wherein the resolver component resolves a fax recipient's name entered via the application interface against one or more address books.

13. The system of claim 12, wherein the resolver component resolves a recipient's name entered via the user interface against an address book selected by the user.

14. The system of claim 9, wherein the resolver component resolves an entered fax number.

15. The system of claim 9, wherein the resolver component is further configured to: resolve a fax recipient's name entered via the user interface against one or more address books; and resolve a fax number entered via the user interface.

16. The system of claim 9, wherein the fax application is configured to work with MAPI-compliant address book providers.

17. The system of claim 9, wherein the encoding component encodes fax addresses by pre-pending the fax-specific globally unique identifier (GUID) to the fax address.

18. A computer implemented method to enhance a user's fax addressing experience, the method comprising:

providing, on a display, a user interface to a fax application that facilitates user composition of a fax including addressing information for a fax recipient, the fax application being configured to utilize a network-accessible fax service provider, the user interface comprising one or more fields which permit entry of data relating to the fax, the one or more fields including a "To" field in which address information may be entered;

providing, via the user interface, multiple different ways that enable the user to address the fax, at least one of which enabling the user to enter, via an input device, fax recipient addressing information into at least one of the one or more fields;

providing, via the application, a number composition helper that is configured to help the user enter the addressing information in a fax format, the fax format comprising [Name]<Number>, wherein the [Name] part of the format is optional, and wherein the <Number> part of the format is a canonical number, providing at least a portion of the addressing information onto an addressing line for the fax;

providing a resolver component of the fax application that is configured to resolve fax formatted addressing information in different ways;

in response to determining that the fax formatted addressing information is resolved, presenting the fax formatted addressing information in the user interface with underlining and enclosed in angle brackets;

providing a multiple address book support component that is configured to enable the user to select from amongst different address books, at least one of which being a MAPI-compliant address book; and providing an encoding component that is configured to encode fax format addresses so that the fax format addresses can be used in messaging application programming interface (MAPI)-compliant contexts.

19. A system of claim 1, wherein the fax functionality is configured to prevent the fax format address from being resolved as an e-mail address by pre-pending a fax-specific globally unique identifier (GUID) to the fax format address.

* * * * *